Feb. 27, 1945. F. H. KENT 2,370,248
MANURE LOADER
Filed Sept. 7, 1943 2 Sheets-Sheet 2

Fred H. Kent Inventor,
Atty.

Patented Feb. 27, 1945

2,370,248

UNITED STATES PATENT OFFICE 2,370,248

MANURE LOADER

Fred H. Kent, Dutton, Ontario, Canada

Application September 7, 1943, Serial No. 501,504

4 Claims. (Cl. 198—8)

This invention relates to loading machinery and more particularly to a manure loader or the like.

The principal object of this invention is to provide means for the transfer of manure from a manure pile to a mobile transport with a minimum of labor. Another object of the invention is to provide a mobile loader which may be moved from place to place utilizing the same source of power as used to operate the loading mechanism.

A further object of the invention is to provide wheel clearance for the machine so that it may be directed deep into the manure pile with the result that a minimum of manipulation of the machine is required. A fourth important object is to provide for the adjustment of the machine so that the conveyor may be raised or lowered to pick up manure at different heights.

Another important object is to provide a chute which carries a means of controlling the fall of manure into the waiting vehicle.

That chute can be loaded where it is difficult for the unloading vehicle to get into the pit and be unloaded by coming back where the unloading vehicle stands.

Still other objects of a more general nature are, to provide a relatively simple, durable machine of the character set forth which may be operated by one person and which is comparatively inexpensive to manufacture, to operate and maintain.

With the above noted and other objects in view which may appear as the description proceeds the invention resides in the novel construction, combination and arrangement of co-operating parts as hereinafter more specifically set forth, claimed and shown in the accompanying drawings forming part of this application and in which:

Fig. 1 is a side elevational view of my invention for loading manure or the like.

Figure 1:
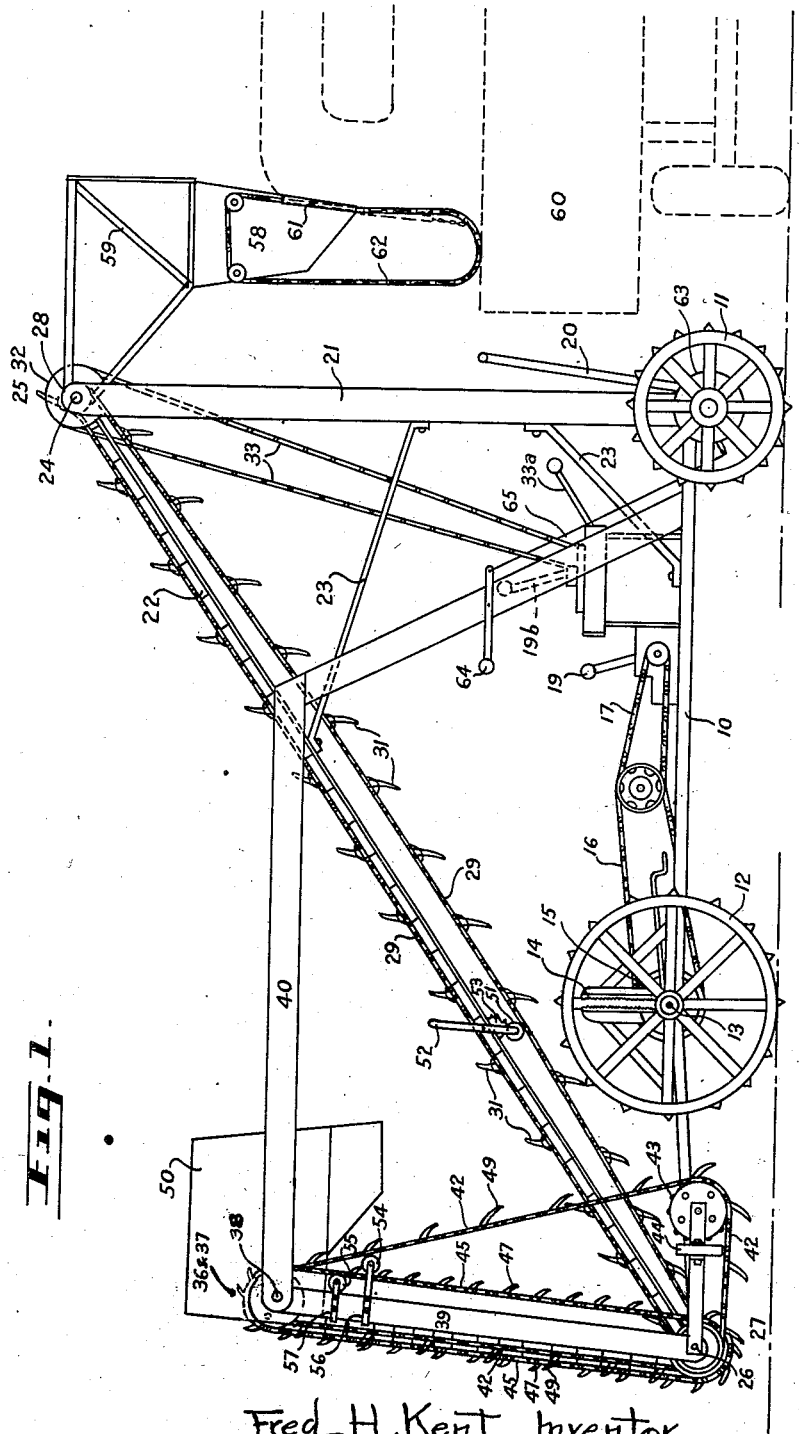
Figure 2:
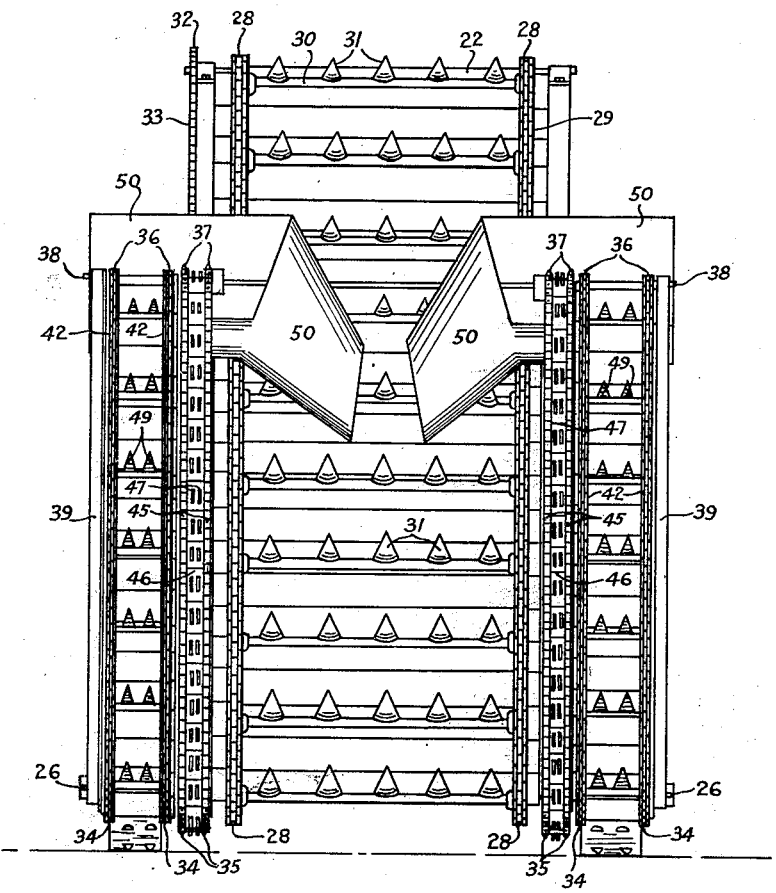
Fig. 2 is a front elevational view thereof.

Referring more in detail to the drawings in which similar reference characters designate corresponding parts, throughout the several views, it will be seen that the invention consists of a chassis 10, carried at the rear by wheels 11, and at the front by traction wheels 12, the front traction wheels being spaced back from the front extremity to provide ample space for the conveyor mechanism as will hereinafter be explained in detail. The front traction wheels are mounted on the axle 13, which is adjustably mounted in a ratchet 14, for the purpose of raising or lowering the front traction wheels with respect to the frame with the result that the front extremity of the frame may be varied in height from ground level.

A sprocket 15, on the front axle 13, is connected by a chain drive 16 and 17, to the motor 18, which is controlled through the clutch 19 and 19b. To move the device into the manure pile or from one location to another, the motor of the vehicle may be conveniently used. For extended transportation the loader may be attached to a vehicle by means of the tongue 20, and drawn thereby.

The conveyor belt is supported on a frame which consists of upstanding posts 21, at the rear of the machine and a ramp or conveyor bed 22, extending from the top of the upstanding post 21, to the front of the chassis 10, the whole supported and strengthened by brackets 23. A shaft 24, is supported at 25, across the top of the upstanding posts 21, and a shaft 26, at 27, across the front extremity of the chassis. Sprocket wheels 28, disposed in pairs, in complementary alignment on the shafts 24 and 26, carry an endless chain conveyor 29, laying on belt bed 22, and which supports spaced apart rods 30, on which relatively wide teeth 31 are fixed.

A sprocket 32, on one extremity of the shaft 24, is connected to the motor 18, by means of a chain drive 33, by which the power is controlled through the clutch 33A.

Figure 3:
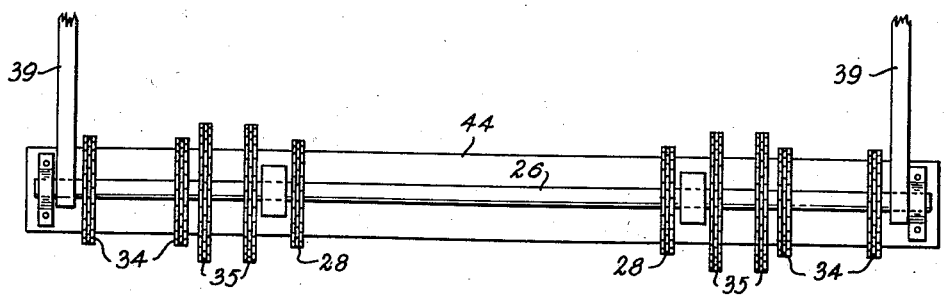
Fig. 3 is a view of the lower shaft layout.

The shaft 26 is extended to each side of the chassis and carries thereon as shown in Fig. 3, of the accompanying drawings two pairs of spaced apart sprocket wheels 34 and 35, at each end which align respectively wtih two pairs of sprocket wheels 36, and 37, on the shaft 38, supported on a frame 39, strongly braced with members 40 and 41. The pairs of sprocket wheels 34 and 36 carry an endless chain conveyor 42, which runs upward perpendicular to the ground and downward on an incline to meet the sprocket wheel 43, attached to the cross member 44. The return end is on an incline to clear the other aprons. The other pairs of sprocket wheels 35 and 37, relatively larger in diameter carry also an endless chain conveyor 45, which has spaced apart rods 46, and relatively small teeth 47, and runs perpendicular to the ground all along. The chain conveyor 42, carries rods 48, with relatively large teeth 49.

A chute 50 is secured to each frame 39, and arranged to receive the manure discharged from the conveyors on each side of the chassis and direct onto the main conveyor belt.

Each conveyor apron is equipped on each side with a chain tightening device and consists of, in the case of the main apron 29, a wheel 51, rolling and binding the return side of the chain, held by an adjustable arm 52, which stays in place by a ratchet 53. In the case of aprons 42 and 45, the binding wheels 54 and 55, are located on top, close to the shaft 38, and working on the return side of the conveyor belts. The binding wheels are held by arms 56 and 57, which are adjustable by means of a slot and fasten to upstanding posts 39.

A chute 58 supported on brackets 59, at the top of the uprights 21, is arranged to receive the manure discharged from the main conveyor and direct it into the waiting vehicle 60.

The chute is provided with a false front 61, which is removable by causing it to slide downward with an endless chain 62. That slinding door regulates or stops the fall of the manure as desired.

The rear wheels 11 are equipped with brakes 63 on each one and are controlled by arms 64 fastened on braces 41, and connected by steel wire 65.

In operation the motor 18, is utilized to direct the loader toward a manure pile whereupon the height of the lowermost extremity of the conveyors may be adjusted and the conveyors actuated through the medium of the chain drive 33, which causes, the teeth of the conveyors to dig into and remove the manure up the apron and into the waiting vehicle. The conveyor units at each side of the chassis provide sufficient clearance for the machine to be moved forward into the manure.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. A machine of the character described comprising a mobile chassis, a conveyor belt mounted in the chassis, conveyor belts supported by and disposed on each side of the chassis arranged to discharge their contents onto the first named conveyor belt, a motor on the chassis adapted to actuate the conveyor belts, means for adjusting the front of the chassis vertically with respect to the ground level and a transmission associated with said motor for moving the machine.

2. A machine of the class described consisting of a mobile chassis, the front wheels of which may be raised or lowered, a frame on the chassis supporting a conveyor bed in an inclined position from the front of the chassis upward to the rear thereof, two vertical conveyor belts on each side of the front of the chassis, a conveyor belt running on each conveyor bed, the conveyor belts on the side of the chassis arranged to discharge the material on to chutes which direct the material to the main conveyor belt, broad curved teeth carried by the conveyor belts except for the vertical conveyor belts the closest to the main belt and which carry small curved teeth, a motor on the chassis, said motor and transmission arranged to operat the conveyor belts and to move the machine.

3. A machine as claimed in claim 2, having the conveyor belts adjustable for slack by a belt tightening device.

4. A machine as claimed in claim 2, characterized in that the back of the chassis has a large receiving funnel for the manure from the main conveyor belt and same funnel carrying a sliding door controlling or stopping the fall of manure into the vehicle.

FRED H. KENT.